United States Patent [19]

Stayton

[11] Patent Number: 4,975,708

[45] Date of Patent: Dec. 4, 1990

[54] TIME DOMAIN ELECTRONIC ANTENNA BEAM SHAPING

[75] Inventor: Gregory T. Stayton, Glendale, Ariz.

[73] Assignee: Honeywell, Inc., Minneapolis, Minn.

[21] Appl. No.: 430,747

[22] Filed: Oct. 31, 1989

[51] Int. Cl.$^5$ ........................ H01Q 3/02; G01S 13/00
[52] U.S. Cl. ........................................ 342/374; 342/37
[58] Field of Search ................. 342/374, 368, 371, 32, 342/37, 202; 325/24

[56] References Cited

U.S. PATENT DOCUMENTS 4,656,477 4/1987 Ronconi et al. ...................... 342/37
4,658,257 4/1987 Izutani et al. ......................... 342/372

Primary Examiner—Gregory C. Issing
Attorney, Agent, or Firm—Seymour Levine; Albin Medved; Roger W. Jensen

[57] ABSTRACT

An apparatus for electronically narrowing the beam width of interrogation transmissions of an interrogator utilizes three beams of the four beam system not used as the main beam for the transmission of suppression pulses. One side of the main beam is suppressed by the first sidelobe suppression pulse of the interrogation pulse sequence and then the other side of the main beam is suppressed by the second sidelobe suppression pulse within the interrogation pulse sequence. In another mode of operation, the interrogation beam width is controlled by transmitting a suppression pulse on a beam positioned 180° from the main beam. This electronic narrowing of the interrogation beam width reduces the number of overlapping replies received by the interrogator and enables the interrogator to properly sort out and not lose or misinterpret replies received by proximity transponder equipped aircraft.

6 Claims, 4 Drawing Sheets

TIME DOMAIN ELECTRONIC ANTENNA BEAM SHAPING

BACKGROUND OF THE INVENTION

1. Field of the Invention

The invention pertains to traffic alert and collision avoidance systems, and more particularly, to such systems that cooperatively function with Air Traffic Control Radar Beacon Systems which provide intruder aircraft radar beacon surveillance.

2. Description of the Prior Art

A Traffic Alert and Collision Avoidance System (TCAS) installed on an aircraft cooperates with Air Traffic Control (ATC) by utilizing the ATC Radar Beacon Systems (ATCRBS) transponders installed in most aircraft worldwide and the new Mode-S transponders to provide locations of other aircraft in the immediate vicinity of the TCAS equipped aircraft. TCAS provides surveillance within the ATC System by transmitting interrogating signals to the ATCRBS equipped aircraft and measuring the relative range, altitude, and bearing from the responses of the ATCRBS transponder. The measured data and the rate of change of this data are utilized by TCAS to provide a prediction of aircraft penetration into a predetermined TCAS protection volume within a subsequent approximate thirty seconds of flight time. When an aircraft penetration is predicted within this time, an advisory is given to the pilot to climb to a new altitude, maintain his present altitude, or descend from his present altitude.

A problem with this system is that ATCRBS equipped aircraft respond to a non-unique interrogation. Thus, all ATCRBS transponders answer to the same interrogation when detected. Mode-S transponders respond to a unique address and may therefore be individually interrogated. To provide adequate surveillance of ATCRBS equipped aircraft, a procedure has been developed that segments the air space in the manner that permits only a limited number of ATCRBS equipped aircraft to respond at one time. This procedure, known as Whisper-Shout interrogates aircraft with increasingly stronger signals so that aircraft closer in range to the interrogating aircraft reply before aircraft located at greater ranges. ATCRBS transponders reply after two interrogation pulses, spaced twenty-one microseconds apart, have been detected. To prevent the closer proximity aircraft from replying to the stronger signals, a pulse having an amplitude lower than the interrogation pulse amplitudes is transmitted two microseconds before the first interrogation pulse. Initially, the first pulse, the suppression pulse, will not be detected and the transponder will reply after the reception of the two interrogation pulses. These transponders are designed to suppress a response when two pulses two microseconds apart are detected. Consequently, as the signal level of the interrogation is increased by the interrogating TCAS for detection by transponders at the longer ranges, the suppression pulse and the interrogation pulses will be detected at the closer ranges and the responses from the ATCRBS equipped aircraft at these closer ranges will be suppressed.

TCAS signals are transmitted by a phased array antenna which provides four sequential beam positions for performing 360° surveillance. Each beam, however, contains sidelobes in which a close-in aircraft may receive the suppression pulse pair at a reduced amplitude from that of the main beam for which the first pulse is not detected, thus permitting the closer proximity aircraft outside the interrogation beam to respond to interrogation signals intended for aircraft at greater ranges inside the interrogation beam. To prevent such an occurrence, a sidelobe suppression pulse P2 is simultaneously transmitted with the suppression pulse pair on a cardioid beam having a notch at the peak of the main beam that is formed by coupling the P2 modulated RF signal to the antenna elements with appropriate phasing. The amplitude of the P2 pulse is such that it is detected only by the ATCRBS transponder on aircraft at closer ranges outside the interrogation beam, and when detected, suppresses the response from the ATCRBS transponder. The appropriate phasing of the antenna elements is established by applying P2 modulated RF signals with proper phase to three of the four input terminals of the beam forming network.

Current TCAS designs locate the active high power RF switches which direct the pulsed RF signals to the terminals of the antenna feed network in the TCAS computer unit located in an electronic's bay of the aircraft, thereby requiring long coaxial lines to couple the TCAS switches to the beam forming network of the antenna. Long coaxial lines do not provide stable phase matching characteristics. Systems of the prior art utilize calibration techniques to phase match the cables and firmly secure the cables to minimize phase variations due to cable vibrations. The present invention accomplishes sidelobe suppression and main beam narrowing with surveillance beams established by the beam forming network, thereby eliminating the requirement of phase matching long coaxial cables between the TCAS computer unit and the antenna.

SUMMARY OF THE INVENTION

In accordance with the principles of the invention, responses to interrogation signals received by transponders in the sidelobe region of the main beam, are suppressed by transmitting second and third suppression pulses on beams adjacent to the main beam. The second suppression pulse is provided at a time interval after the transmission of the first interrogation pulse that is equal to the time interval at which the first suppression pulse precedes the transmission of the first interrogation pulse. This second suppression pulse is transmitted on a beam which is angularly positioned to one side of the main beam with sufficient amplitude to be detected by transponders receiving signals from the sidelobes that are at angular positions outside the crossover point of the main and suppression beams. The third suppression pulse is transmitted on a beam which is angularly positioned on the other side of the main beam at a time preceding the second interrogation pulse that is also equal to the time at which the first suppression pulse precedes the first interrogation pulse. This third suppression pulse, like the second suppression pulse, is of sufficient amplitude to be detected by transponders that are at angular positions outside the crossover point of the main and suppression beams.

To suppress responses from Mode-S transponders, a fourth suppression pulse is transmitted on the main beam at a time after the transmission of the second interrogation pulse that is equal to the time at which the first suppression pulse precedes the first interrogation pulse. This fourth suppression pulse is of an amplitude that is equal to the amplitude of the interrogation pulses and will therefore be detected by all Mode-S transponders that detect the interrogation pulse. Consequently, all Mode-S responses will be suppressed due to the reception of two pulses within the suppression time interval.

Further in accordance with the invention, close-in transponder interrogations for which TCAS does not transmit the suppression pulse preceding the first interrogation pulse is limited to a preselected angular range within the main beam by the transmission of a suppression pulse at the suppression time after the transmission of the first interrogation pulse. This pulse, the amplitude of which determines the interrogation beam width, is transmitted on a beam that is diametrically positioned to the main beam and its amplitude determines the interrogation beam width of the main beam.

The invention will be described more fully by way of example with reference to the accompanying drawings.

DESCRIPTION OF THE PREFERRED EMBODIMENTS

Figure 1:
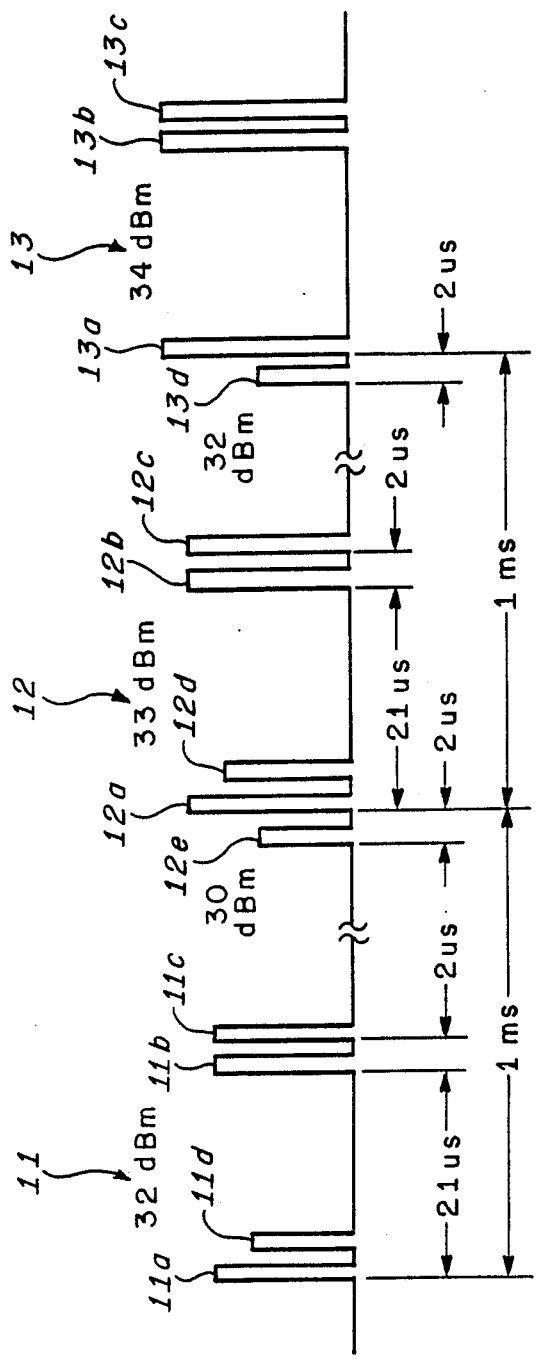
FIG. 1 is an illustration of the pulses transmitted by TCAS for transponder interrogation in accordance with the prior art.
Figure 2:
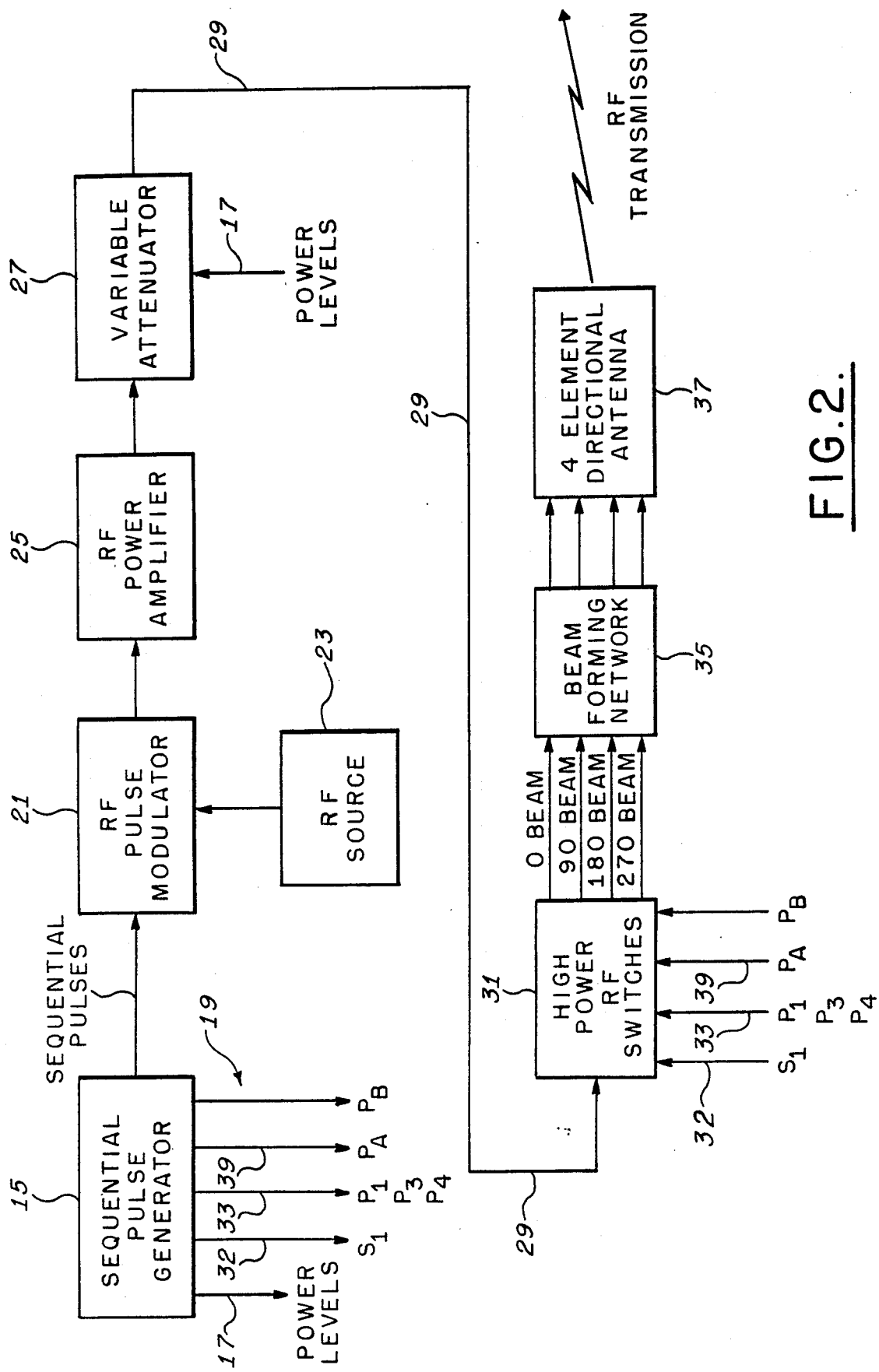
FIGS. 2 is a block diagram of a preferred embodiment of the invention.

Refer to FIG. 1 wherein TCAS pulse transmissions of the prior art for the interrogation of ATCRBS transponders are represented. An initial interrogation sequence 11 for transponders within close-in detection ranges include a first interrogation pulse 11a, a second interrogation pulse 11b, transmitted twenty-one microseconds after the first interrogation pulse, and a suppression pulse 11c transmitted two microseconds after the second interrogtion pulse for the suppression of Mode-S transponders. These three pulses are transmitted at a level, as for example, 32 dBm, so as to be detectable by transponders only within a limited range of the interrogator. After the first interrogation pulses 11a and 11b have been detected by an ATCRBS transponder, the receiver is disabled and a response transmitted. Thus, the Mode-S suppression pulse 11c is not detected by the ATCRBS transponder. The Mode-S transponder within the detection region detects all three pulses and since the suppression pulse 11c is received within two microseconds of the second interrogation pulse 11b, the Mode-S transponder is disabled and will not respond should it receive pulses in a sequence simulating his address code from the TCAS broadcast to ATCRBS transponders.

Two microseconds after the interrogation pulse 11a, a sidelobe suppression pulse 11d is transmitted on a cardioid pattern which is directed 180° from the peak of the main beam. This sidelobe suppression pulse is transmitted at a level one dB below the interrogation pulses. The sidelobe suppression pulse 11d disables transponders receiving interrogation pulses from the sidelobes of the main beam and narrows the angular region of response within the main beam, as will be explained.

After the close proximity transponders have been interrogated, the level of the interrogation pulses are raised, as for example, to 33 dBm, as represented by the pulse sequence 12. A first interrogation pulse 12a, a second interrogation pulse 12b, a Mode-S suppression pulse 12c, and a sidelobe suppression pulse 12d are transmitted at the higher levels with the same pulse spacings discussed previously. A fifth pulse 12e is transmitted on the main beam two microseconds before the first interrogation pulse 12a at a level 3 dB below the level of the interrogation pulses 12a and 12b. The close-in targets initially detect the suppression pulse 12e and the interrogation pulse 12a two microseconds apart. With this reception, the close-in transponders are disabled, for a thirty-five microsecond interval, and do not respond. Transponders at greater ranges do not detect the lower amplitude suppression pulse 12e and respond as previously described. When interrogation of transponders in the second detection range is completed, the amplitude of the interrogation pulses is increased once again, as for example, to 34 dBm, as indicated by the pulse sequence 13. In this sequence, the suppression pulse 13e preceding the first interrogation pulse 13a is set at a level 2 dBm below the level of the interrogation pulses 13a and 13b. The sequence of five pulses with increasing amplitudes is repeated until responders over the entire detection range of interest have been interrogated.

As previously stated, the cardioid pattern used for sidelobe suppression pulses 11d, 12d, and 13d is difficult to generate when the switches controlling the antenna beam pattern are located so remotely as to necessitate long coaxial lines between these switches and the input terminals of the array antenna feed network. Under these conditions, another method for transmitting the suppression pulses is required.

Figure 3A:
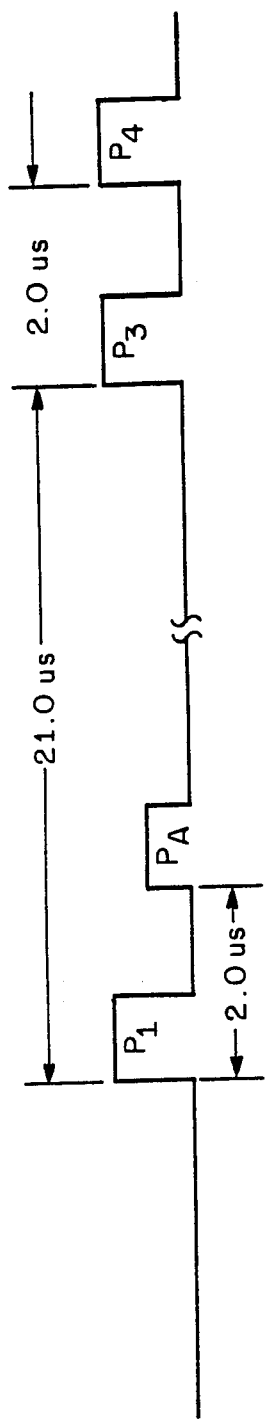
FIGS. 3A and 3B are representations of pulses transmitted in accordance with the invention.
Figure 3B:
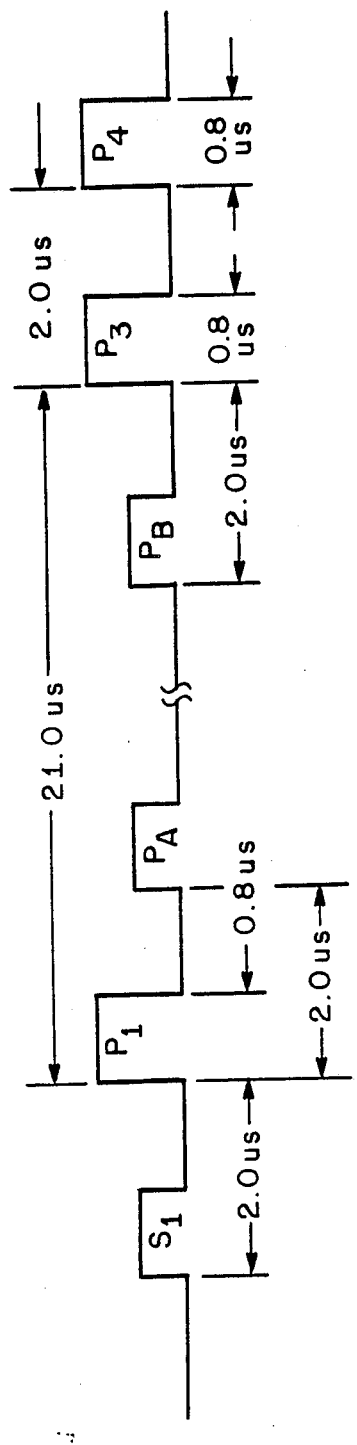
Figure 4:
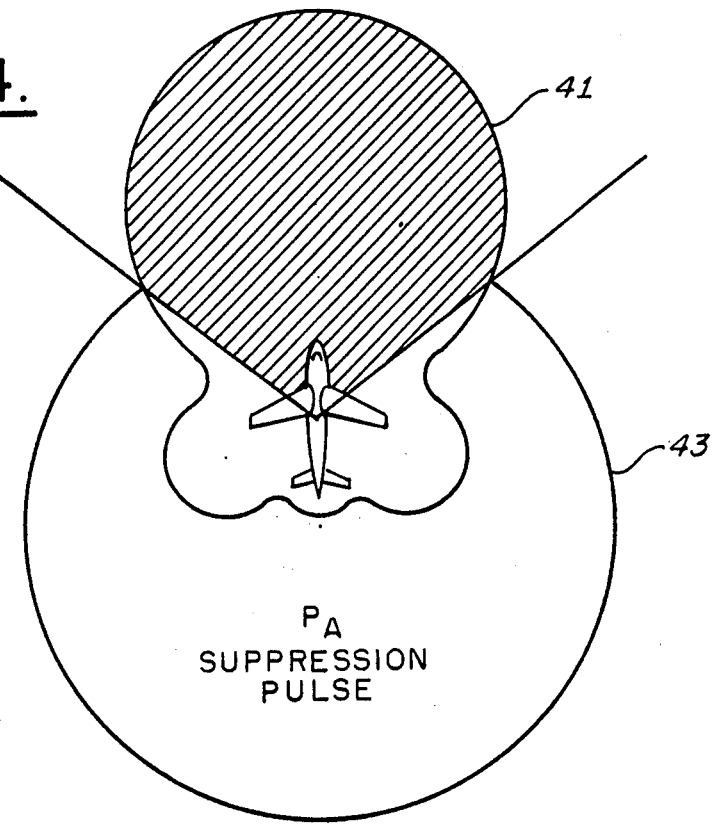
FIGS. 4 and 5 are representations of detection bands provided in accordance with the invention.

Refer now to FIGS. 2 through 5. A sequential pulse generator 15 in FIG. 2 generates a sequence of equal amplitude pulses with spacing therebetween, yet to be described. With each pulse generated, the sequential pulse generator provides a signal on a line 17 representative of the power level of that pulse and switching signals on lines generally indicated as 19. The equal amplitude sequential pulses are coupled to an RF modulator 21 wherein RF signals from a source 23 are pulse modulated and coupled through an RF power amplifier 25 to a variable attenuator 27 responsive to the power level signals on the line 17. When the targets at the close-in detection ranges are interrogated, the variable attenuator 27 in response to the power level signal on the line 17 provides an amplitude to the first pulse of the sequence that is equal to the amplitude of the first interrogation pulse. This pulse is coupled from the variable attenuator 27 via a line 29 to a network of switches 31 which in response to a switch signal associated with the initial pulse provided on line 33, couples the pulse modulated RF signal to one of four input terminals of a beam forming network 35 of a four element directional antenna 37. Each of the four input terminals to the beam forming network 35 respectively correspond to one of four beams provided by the directional antenna 37. The coupling of this first interrogation pulse may be to the zero degree beam which has a peak directed along the axis of the aircraft carrying the interrogator, thereby establishing this beam as the main beam for the sequence of pulses. As shown in FIG. 3A, two microseconds after the generation of the first interrogation pulse, a second pulse is generated with the power level representative signal that increases the attenuation of the variable attenuator 27 to provide a RF modulated pulse PA of amplitude less than the interrogation pulse $P_1$. The switch signal associated with the second pulse provided by the sequential pulse generator 15 on line 39 directs the high power RF switches to couple the pulse modulated RF signals to the input terminal corresponding to the 180° beam 43 shown in FIG. 4. When both pulses $P_1$ and $P_A$ are detected, the ATCRBS transponder detecting these two pulses is disabled. A third pulse is generated by the sequential pulse generator 15 twenty-one microseconds after the generation of the initial pulse and a fourth pulse is generated two microseconds after the third pulse. The power level signals provided on line 17 with the third and fourth pulses re-establish the variable attenuator 27 setting to provide pulse modulated signals $P_3$ and $P_4$ at power levels equal to that of the pulse modulated RF signal $P_1$. The switching signals associated with the pulses $P_3$ and $P_4$ are coupled to the high power switches 31 via the line 33 to direct the coupling of the pulse modulated RF signals to the input port of the beam forming network corresponding to the main beam, which for the situation described, is the 0° beam. As stated previously, if the suppression pulse on beam 43 is not detected, the detection of the pulses $P_1$ and $P_3$ cause the ATCRBS transponders to generate a response, the generation of the response disables the receiver and prevents the detection of the suppression pulse $P_4$. Mode-S transponders in the detection region that detect interrogation pulse $P_1$ are suppressed with the detection of the pulse $P_4$ two microseconds after the pulse $P_3$ has been detected, and are thereby unable to reply with an ATCRBS response. It should be recognized that the interrogation region within the main beam may be controlled with the amplitude of the suppression pulse $P_A$. Refer to FIG. 4, wherein relative radiation levels of the main beam 41 and the 180° beam 43 are shown. The shaded region within the main beam 41 represents the angular range within which the pulses radiated by the beam 43 are not detected. It should be apparent that this angular range is increased or decreased with the radiation level of the $P_A$ pulse within the beam 43. Thus, the angular range of responses to interrogation pulses from the TCAS interrogator may be controlled with the level of the transmitted $P_A$ pulse within the 180° beam 43.

Figure 5:
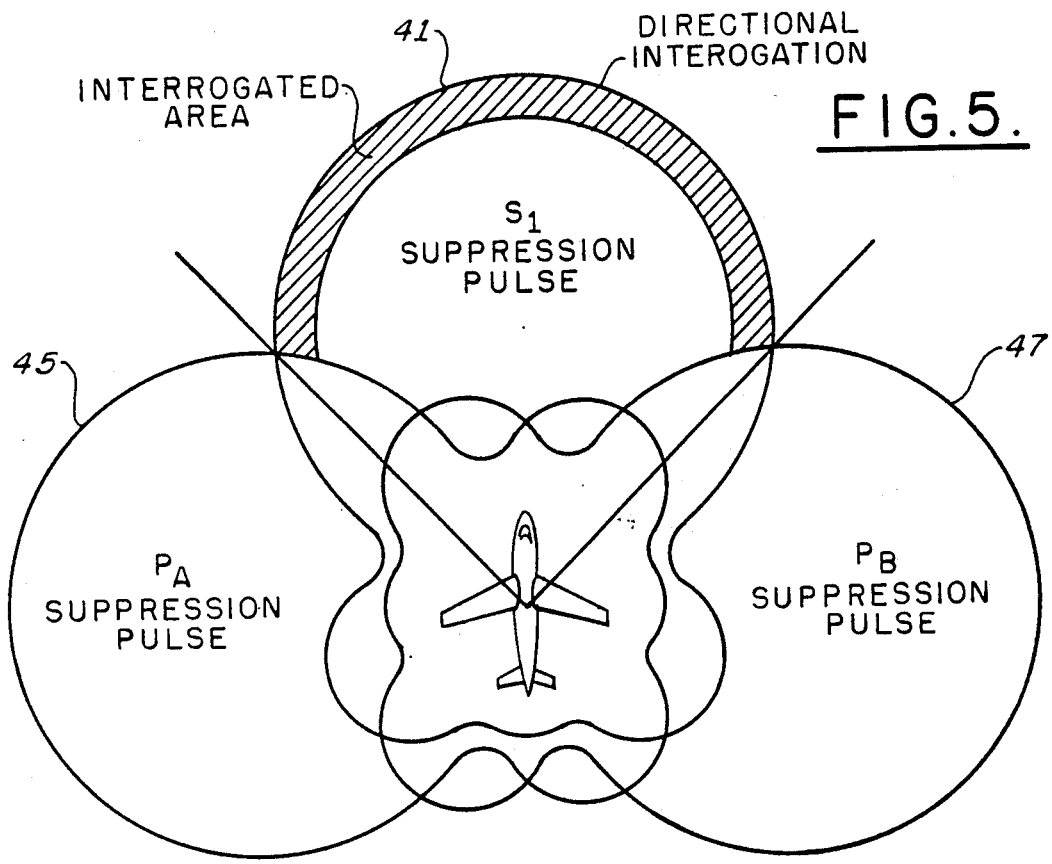

After the close proximity transponders have been interrogated, a second sequence having six pulses is generated by the sequential pulse generator 15. The first of these pulses has an associated power level signal on the line 17 which causes the variable attenuator 27 to provide a pulse modulated RF signal at a level less than the pulse modulated RF signal provided by the variable attenuator 27 in response to the associated power level signals of a second pulse generated two microseconds after the first pulse. These pulses $S_1$ and $P_1$, shown in FIG. 3B, are the conventional suppression and interrogation pulses of a TCAS interrogation signal, respectively, and are coupled to the main beam by the high power RF switches 31 in response to switching signals on the lines 32 and 33, respectively. The interrogated area provided by the pulses $P_1$ and $S_1$ are limited by suppression pulses $P_A$ and $P_B$, yet to be described, is shown in FIG. 5. Suppression pulse $P_A$ having an amplitude less than the interrogation pulse $P_1$ is generated in a similar manner and is coupled to an input terminal of the beam forming network 35 by the switches 31 in response to a switching signal on a line 39 corresponding to a beam 45 at an angle of 270° from the main beam 41. As indicated in FIG. 5, this second suppression pulse $P_A$ may be detected within the interrogated area wherein the first suppression pulse $S_1$ is not detected. In this manner, the angular range to the left of the axis of the aircraft carrying the interrogator may be varied with increases and decreases in the transmitted second suppression pulse $P_A$ on the 270° beam. A fourth RF pulse $P_B$ in the second sequence is generated nineteen microseconds after the first interrogation pulse $P_1$. This fourth RF pulse is provided from the variable attenuator 27 at a power level that is less than that of the interrogation pulse $P_1$ and a second RF interrogation pulse $P_3$ generated twenty-one microseconds after the first RF interrogation pulse. This fourth RF pulse is coupled by the high power switches 31 to an input terminal of the beam forming network 35 corresponding to a beam 47 formed at an angle of 90° to the aircraft axis. The RF pulse radiated on this beam 47 acts as a suppression pulse, suppressing responses from transponders detecting both the pulse $P_B$ and the pulse $P_3$ and acts to limit the angular range of the interrogated area to the right of the main beam axis in the manner similar to that in which the suppression pulse $P_A$ limits the angular range to the left of the axis. The remaining pulse of the six pulse sequence $P_4$ is the suppression pulse for the Mode-S transponder as previously described. When interrogation of the second area is completed, the power level signals coupled to the variable attenuator 27 associated with each pulse in the six pulse sequence is increased and the interrogation proceeds for the next interrogated area, in a manner as just described.

Once the entire range of detection areas has been interrogated for the 0° beam, the high power RF switches 31, in response to the switching signals from sequential pulse generator, establish the main beam as the beam directed 90° to the carrying aircraft axis and the sequence described above is repeated. This repetition continues cyclically to establish the main beam as the 90° beam, the 180° beam, the 270° beam and then back to the 0° beam.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An apparatus comprising:
   generator means for providing a sequence of pulses with predetermined time spacings therebetween, for providing signals representative of amplitudes of pulses in said sequence of pulses, and for providing switch signals respectively associated with pulses in said sequence of pulses;
   sequence means coupled to receive said sequence of pulses and responsive to said representative signals for providing said sequence of pulses with amplitudes in accordance with said representative signals: and
   switch means having a plurality of output terminals and an input terminal coupled to receive said sequence of pulses, responsive to said switch signals for coupling pulses of said sequence of pulses from said input terminal to output terminals of said plurality of output terminals selected in accordance with said associated switch signals.

2. An apparatus in accordance with claim 1 wherein said sequence means includes:
   source means for providing RF signals;

modulator means coupled to said generator means and said source means for providing equal amplitude pulse modulated RF signals; and attenutor means coupled to said modulator means and responsive to said representative signals for providing pulse modulated RF signals having amplitudes in accordance with said representative signals such that said sequence of pulses is a sequence of pulse modulated RF signals with pulse amplitudes in accordance with said representative signals.

3. An apparatus in accordance with claim 2 wherein said output terminals are arranged for respectively coupling to an equal number of input terminals to an array antenna feed network, each input terminal of said feed network associated with one beam direction of a plurality of beam directions.

4. An apparatus in accordance with claim 3 wherein said generator means repeats said sequence of pulses at predetermined intervals with a preselected time spacing between each interval, and wherein said representative signals cause said attenuator means to increase pulse amplitudes in said sequence of pulses after each interval.

5. An apparatus in accordance with claim 4 wherein: said sequence of pulses includes first, third, and fourth pulses having amplitudes less than second, fifth, and sixth pulses; and said switching means, in response to associated switch signals, provides said first and second pulses at an output terminal associated with a beam at a selected beam direction designated as a main beam, said third pulse at an output terminal associated with a beam angularly positioned to one side of said main beam, said fourth pulse at an output terminal associated with a beam angularly positioned to a side of said main beam other than said one side, and said fifth and sixth pulses at said output terminal associated with said main beam.

6. An apparatus in accordance with claim 5 wherein said generator mans further provide a pulse set having said second, third, fifth and sixth pulses, and wherein said switching means, in response to associated switch signals, couples said second, fifth and sixth pulses to said output terminal associated with said main beam and said third pulse to an output terminal associated with a beam positioned in a diametric direction from said main beam.

* * * * *